(No Model.)
J. B. ALLFREE.
BELT TIGHTENER.
No. 328,373. Patented Oct. 13, 1885.
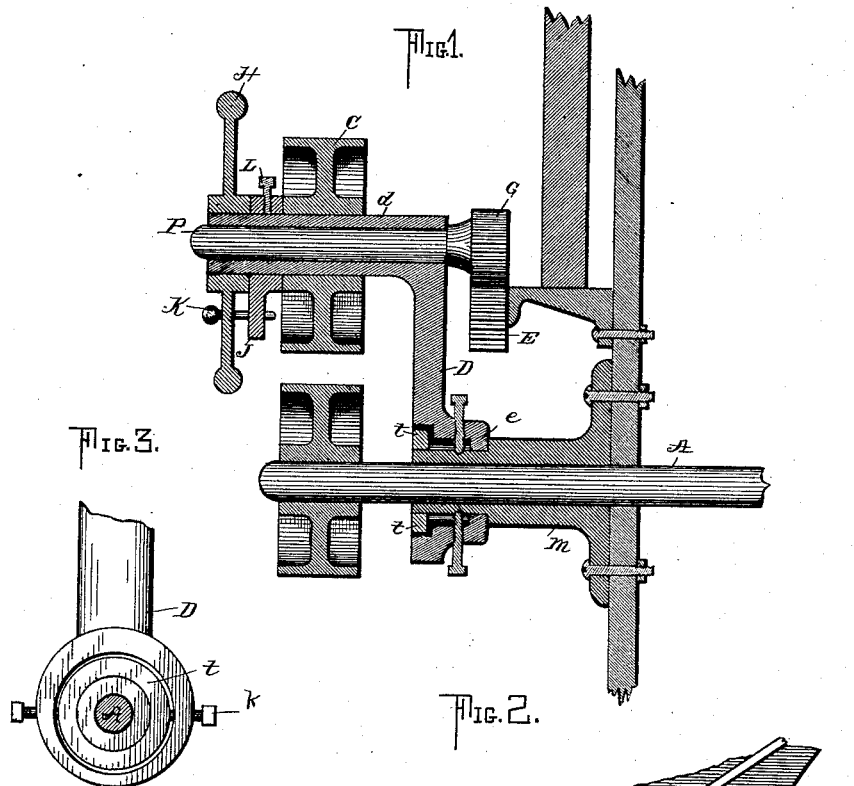
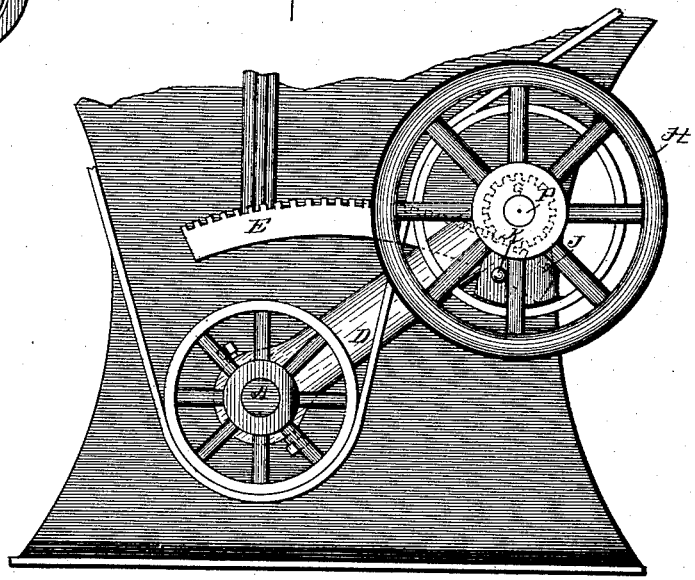
Witnesses
W. M. Rheem
David Mead
James B. Allfree  Inventor
By his Attorney
Wm. C. W. Sutire

UNITED STATES PATENT OFFICE.

JAMES B. ALLFREE, OF CUMBERLAND, MARYLAND, ASSIGNOR OF ONE-HALF TO ROBERT SHRIVER AND HARRISON SWARTZWELDER, BOTH OF SAME PLACE.

BELT-TIGHTENER.

SPECIFICATION forming part of Letters Patent No. 328,373, dated October 13, 1885.

Application filed July 9, 1885. Serial No. 171,044. (No model.)

*To all whom it may concern:*

Be it known that I, JAMES B. ALLFREE, a citizen of the United States, residing at Cumberland, Maryland, have invented new and useful Improvements in Belt-Tighteners, of which the following is a specification.

This invention relates to belt-tighteners, and is designed particularly for use in connection with roller-mills.

The object of the invention is to produce a belt-tightener which may be readily attached to a mill, or any other structure to which it may be desired to apply it, which shall be capable of rapid adjustment, and so constructed and arranged that it may be secured rigidly in place to impose any desired tension upon the belt to be manipulated, and not liable to become displaced by the jarring of the mill when in operation; finally, the object is to provide a simple and effective means of changing the position of the idle-pulley, which is pressed against the belt, in order that the belt may run true, notwithstanding any inequality that may exist therein.

With these objects in view my invention consists of an idle-pulley carried upon a swinging arm, the said arm being capable of being moved to bring the pulley to exert any desired amount of strain upon the belt to which it is applied, or moved away to relieve the belt entirely from strain, the said arm being provided with a shaft having means for retaining it at any point in its revolution, which shaft carries a cog-wheel taking into a toothed segment secured to the side of the mill, whereby the arm may be held in any desired position in relation to the belt.

The invention further consists of a novel means for changing the angle of the arm carrying the idle-pulley, in order to compensate for any unevenness in the belt.

In order that the construction and advantages of my invention may be clearly understood by those skilled in the art, I will now proceed to describe the same in connection with the accompanying drawings, in which—

Figure 1 represents a side elevation of a sufficient part of a grinding-mill to show the arrangement of the belt-tightener, which is shown as applied thereto. Fig. 2 is a section taken through the arm of the belt-tightener, and Fig. 3 is a detail view, showing the means for changing the inclination of the arm upon which the idle-pulley is carried.

In the drawings, A represents the counter-shaft of a grinding-mill, the bearing M of which is secured to the shell of the mill. D represents an arm provided at its lower end with an opening for the reception of the reduced end of the bearing, on which it is free to oscillate. In order that the angle of this arm may be changed at will to compensate for any unevenness in the belt, I provide the said arm with a bearing of the form shown more clearly in Fig. 2. Its inner bearing-surface is a collar, $s$, formed upon the said arm, and its outer bearing-surface is formed by the detached collar $t$, which is connected with the arm D by set-screws $k$ passing through the said arm and bearing upon the collar. The diameter of the collar is somewhat smaller than that of the opening in the arm, thereby admitting of a raising or lowering of the outer end of the said bearing by means of the set-screws. A convenient manner of securing the arm against sliding by its bearing is shown in Fig. 1. This consists in a circumferential groove in the said bearing, and the screw-pins $l$, which are inserted through the bearing portion of the arm and take into the said groove.

The upper end of the arm D is provided with a right-angular portion, which is so formed as to serve as a bearing for an idle-pulley, C, which pulley is designed to be moved toward and away from the driving-belt when it is desired to exert a strain upon the said belt, or to render it free from strain.

In order that the idle-pulley may be rapidly moved to and securely retained in any desired position relative to the belt, I employ the means now to be described.

The upper right-angular portion, $d$, of the arm D is hollow, and through the opening therein passes a shaft, P, upon whose inner end is a pinion, G. This pinion G engages with a rack, E, attached to the side of the mill, which rack is curved to correspond with the arc of a circle described by the pinion P as the arm D is moved back and forth to change the position of the idle-pulley relative to the driving-belt. Thus it will be seen that it is only necessary to turn the shaft P in the proper direction to move the arm and idle-pulley nearer to or away from the belt.

As a convenient means of turning the shaft, I provide the outer end thereof with a hand-wheel, H, which is keyed or otherwise secured to the shaft in order to turn the same.

J represents a plate having a hole near its upper edge for the insertion of the bearing of the idle-pulley C, to which bearing the plate is secured rigidly by means of the set-screw L, passing through the said plate and bearing on the arm d. The lower portion of the plate J has a series of perforations, through which may be inserted a pin, K, introduced between the spokes of the hand-wheel. By this means the hand-wheel may be retained against turning, and thereby secured at any desired point in its revolution, and in this way the idle-pulley is rendered capable of being rapidly moved away from or toward the belt, and being securely fixed in any desired position to exert more or less strain upon the belt.

Having thus described my invention, what I claim as new, and desire to secure by Letters Patent, is—

1. A belt-tightener consisting of the swinging arm, the idle-pulley mounted thereon, the rod mounted in the said arm and provided with a pinion, and a rack mounted upon the frame of the mill with which the said pinion engages, and means, substantially as described, for securing the pinion in place.

2. The belt-tightener consisting of the swinging arm having the bearing consisting of the integral collar and the independent collar secured to the said arm by set-screws, the shaft mounted in the upper end of the arm and carrying the pinion, and the segment secured to the side of the mill.

3. A belt-tightener consisting of the swinging arm carrying the idle-pulley, the shaft provided with the pinion at one end and with the hand-wheel at the other, the rack on the mill, and means, substantially as described, for holding the pulley in any desired position relative to the belt.

4. A belt-tightener consisting of the swinging arm, the idle-pulley mounted thereon, the rod provided with the pinion at one end and the hand-wheel at the other, the plate provided with perforations, and the pin inserted through the spokes in the hand-wheel and taking into the plate.

5. A belt-tightener consisting of the swinging arm provided with the right-angular hollow bearing d, the idle-pulley mounted thereon, the rod passing through the said hollow bearing and provided at one end with the pinion and at the other with a hand-wheel, the perforated plate, and a pin passing through the wheel and taking into the said plate, and a rack on the mill, substantially as described.

In testimony whereof I have hereunto set my hand in the presence of two subscribing witnesses.

JAMES B. ALLFREE.

Witnesses:
ROBT. SHRIVER,
F. M. OFFUTT.